United States Patent
Larmigny et al.

(10) Patent No.: US 9,029,817 B2
(45) Date of Patent: May 12, 2015

(54) RADIATION ATTENUATION ELASTOMERIC MATERIAL, A MULTILAYER GLOVE FOR PROTECTION AGAINST IONIZING RADIATIONS AND THEIR USES

(75) Inventors: Jean-Philippe Larmigny, Saint Just D'Ardeche (FR); Jean-Paul Mathieu, Bollene (FR); Dominique Guerin, Trevieres (FR); Antoine Dobrowolski, Bayeux (FR)

(73) Assignees: Areva NC, Paris (FR); Piercan, Paris (FR)

( * ) Notice: Subject to any disclaimer, the term of this patent is extended or adjusted under 35 U.S.C. 154(b) by 0 days.

(21) Appl. No.: 13/388,011

(22) PCT Filed: Jul. 29, 2010

(86) PCT No.: PCT/EP2010/061052
§ 371 (c)(1),
(2), (4) Date: May 14, 2012

(87) PCT Pub. No.: WO2011/012681
PCT Pub. Date: Feb. 3, 2011

(65) Prior Publication Data
US 2012/0217423 A1  Aug. 30, 2012

(30) Foreign Application Priority Data
Jul. 31, 2009 (FR) ..................................... 09 55389

(51) Int. Cl.
*G21F 3/02* (2006.01)
*G21F 3/035* (2006.01)
*C08K 3/22* (2006.01)
*G21F 1/10* (2006.01)

(52) U.S. Cl.
CPC . *G21F 3/035* (2013.01); *C08K 3/22* (2013.01); *G21F 1/103* (2013.01)

(58) Field of Classification Search
USPC ............. 250/505.1, 515.1, 516.1; 2/455, 158, 2/159, 161.6, 167, 16; 252/478
See application file for complete search history.

(56) References Cited

U.S. PATENT DOCUMENTS

| | | | |
|---|---|---|---|
| 2,861,000 A | 11/1958 | Geffcken et al. | |
| 2,899,322 A | 8/1959 | Bromer et al. | |
| 3,029,152 A | 4/1962 | Milne et al. | |
| 3,615,769 A | 10/1971 | Leitz et al. | |
| 3,818,234 A * | 6/1974 | Atkins et al. | 250/515.1 |
| 4,554,258 A | 11/1985 | Francel | |
| 5,252,521 A | 10/1993 | Roberts | |
| 5,357,636 A * | 10/1994 | Dresdner et al. | 2/161.7 |
| 5,548,125 A * | 8/1996 | Sandbank | 250/519.1 |
| 7,582,343 B1 * | 9/2009 | Johnson | 428/36.4 |
| 7,730,554 B2 * | 6/2010 | Wang | 2/161.7 |
| 2004/0124374 A1 * | 7/2004 | Joseph | 250/507.1 |
| 2004/0262546 A1 * | 12/2004 | Thiess et al. | 250/515.1 |
| 2005/0121631 A1 * | 6/2005 | Lagace et al. | 250/516.1 |
| 2005/0211930 A1 * | 9/2005 | DeMeo et al. | 250/516.1 |
| 2005/0233888 A1 * | 10/2005 | Seneschal et al. | 501/45 |
| 2006/0230495 A1 * | 10/2006 | Thiess et al. | 2/167 |
| 2008/0128658 A1 * | 6/2008 | Jungermann et al. | 252/478 |
| 2008/0210874 A1 * | 9/2008 | Cheng et al. | 250/361 R |
| 2009/0106876 A1 * | 4/2009 | Yeung | 2/167 |
| 2009/0109654 A1 * | 4/2009 | Fechner et al. | 362/97.1 |
| 2010/0009836 A1 * | 1/2010 | Sakoske | 501/14 |
| 2010/0175164 A1 * | 7/2010 | Foo | 2/167 |
| 2010/0324236 A1 * | 12/2010 | Murray et al. | 526/116 |
| 2011/0274858 A1 * | 11/2011 | Kapur et al. | 428/34.1 |

FOREIGN PATENT DOCUMENTS

| | | |
|---|---|---|
| FR | 2 911 991 A1 | 8/2008 |
| WO | WO 2004/114323 A1 | 12/2004 |
| WO | WO 2006/069007 A2 | 6/2006 |

OTHER PUBLICATIONS

Hand Protection, UV Process Supply, Copyright 2005, Accessed from <http://www.uvprocess.com/product.asp?code=GLOVES+++G>.*

* cited by examiner

*Primary Examiner* — Jack Berman
*Assistant Examiner* — Jason McCormack
(74) *Attorney, Agent, or Firm* — Miles & Stockbridge P.C.

(57) ABSTRACT

A radiation attenuation elastomeric material which includes an elastomer in which a powder of metal oxides is dispersed, wherein the powder of metal oxides includes from 70 to 90% by mass of bismuth trioxide, from 5 to 15% by mass of tungsten trioxide, and from 5 to 15% of lanthanum trioxide. Multilayer protective gloves incorporating this material are suitable for use in protecting a wearer from ionizing radiation when handling radioactive materials.

26 Claims, No Drawings

RADIATION ATTENUATION ELASTOMERIC MATERIAL, A MULTILAYER GLOVE FOR PROTECTION AGAINST IONIZING RADIATIONS AND THEIR USES

TECHNICAL FIELD

The present invention relates to a radiation attenuation elastomeric material, i.e. having the property of attenuating ionizing radiations and in particular those produced by powders entering the manufacturing of plutonium nuclear fuels.

It also relates to the use of this elastomeric material for manufacturing protective articles against ionizing radiations.

It further relates to a multilayer protective glove against ionizing radiations, at least one layer of each is formed by said elastomeric material, as well as to the use of this glove for protection against ionizing radiations emitted by powders entering the manufacturing of nuclear fuels.

STATE OF THE ART

In a certain number of professions, it is customary to use gloves and other protective articles against ionizing radiations.

This is notably the case in the nuclear industry where certain radioactive materials such as nuclear fuel powders are handled in glove boxes, i.e. sealed enclosures which are provided with specific gloves for protecting the hands, the forearms and a portion of the arms of the operator.

But this is also the case in medicine where ionizing radiations are used for diagnostic and therapeutic purposes, in the plastic material industry where irradiations are used for obtaining chemical polymerization, grafting, cross-linking or degradation effects of polymers, or further in inspection and monitoring laboratories, for example for manufactured parts, where analytical techniques based on the use of ionizing radiations are used.

Most radioprotection gloves presently available on the market are multilayer gloves which comprise a layer formed with an elastomer into which are dispersed fine particles of lead, in the form of metal, oxide or salt, and which is sandwiched between two layers which themselves are only formed with an elastomer.

Considering the toxicity of lead and of its compounds, the manufacturing of these gloves requires heavy and costly equipment for preventing any contamination of the personnel in charge of this manufacturing. Further, removal of the waste stemming from the manufacturing of these gloves as well as that of used gloves requires specific procedures for collecting and treating them, failing which they are quite simply removed in dumps with all the harmful consequences on the environment which this may imply.

Replacement of the use of lead as a radio-opaque filler with that of other metals which are also capable of attenuating ionizing radiations but which are not toxic or in any case have less toxicity has also been suggested recently.

Thus, for example, U.S. Pat. No. 5,548,125 (reference [1]), recommends the use of tungsten particles dispersed in natural rubber or in ethylene-propylene-diene rubber, while patent application US 2004/0262546 (reference [2]) recommends the use of bismuth oxide particles alone or mixed with tungsten oxide, tin oxide or tin oxide/antimony oxide particles dispersed in natural rubber.

It is commonly recognized that with radio-opaque fillers such as tungsten, bismuth, tin and their, oxides, for which the radiation attenuation capacity is less than that of lead, it is extremely difficult to obtain gloves which, while having effectiveness in attenuating ionizing radiations, comparable with that of lead-filled gloves, have satisfactory flexibility and therefore comfort characteristics for those wearing them.

This problem, which is related to the fact that with fillers having less radiation attenuation capacity than that of lead, it is necessary, in order to obtain an elastomeric layer able to ensure comparable radioprotection with that of a layer of lead-filled elastomer, to incorporate into this elastomer a much larger amount of fillers than that required in the case of a lead-bearing filler, is discussed in detail in French patent application 2 911 991 (reference [3]).

This document moreover suggests solving it by encapsulating the radio-opaque filler, in this case bismuth in the form of a trioxide, in liquid droplets which are dispersed within the elastomeric layer. The disappearance of the interface between the bismuth trioxide particles and the elastomer as well as the mobile nature of the dispersed liquid phase would suppress the stiffening effect of bismuth trioxide.

Now, within the scope of their work, the Inventors noticed against all expectations that by using as a radio-opaque filler, a powder comprising bismuth trioxide, tungsten trioxide and lanthanum trioxide in suitably selected proportions, it is possible to obtain gloves, which, while having radiation attenuation properties equivalent to those of a glove comprising an elastomeric layer filled with lead oxide, have flexibility comparable with that of gloves exclusively consisting of an elastomer.

It is on this observation that the present invention is based.

DISCUSSION OF THE INVENTION

Therefore the object of the invention is first an elastomeric material useful for manufacturing protective articles against ionizing radiations, which comprises an elastomer in which a powder of metal oxides is dispersed, and which is characterized in that the powder of metal oxides comprises from 70 to 90% by mass of bismuth trioxide, from 5 to 15% by mass of tungsten trioxide and from 5 to 15% of lanthanum trioxide.

According to the invention, the respective proportions of the elastomer and of the powder of metal oxides in the material may vary to a wide extent depending on the use for which this material is intended and, notably on the radiation attenuation level and on the mechanical properties which are sought within the scope of this use.

This being said, it is generally preferred that the elastomer represent from 15 to 35% by mass of the mass of the material and that the powder of metal oxides itself represent from 65 to 85% by mass of the mass of the material.

For a use such as the manufacturing of gloves and notably of gloves intended for handling powders of nuclear fuels, it is preferred that the elastomer represent 25±2% by mass of the mass of the material and that the powder of metal oxides represents 75±2% by mass of the mass of the material, such proportions actually ensuring an excellent compromise between the radiation attenuation properties and the flexibility characteristics required for this type of glove.

In every case, the powder of metal oxides preferably comprises 80±2% by mass of bismuth trioxide, 10±1% by mass of tungsten trioxide and 10±1% by mass of lanthanum oxide, these proportions between the different oxides having actually shown that they provide the material with optimum radiation attenuation properties.

Moreover, the powder of metal oxides preferably consists of particles for which at least 90% by number have a size comprised between 1 and 100 μm and, even better at least 80% by number, have a size comprised between 1 and 50 μm and this in order to obtain a distribution of this powder as homogeneous as possible in the elastomer.

According to the invention, the elastomer may be selected from very many elastomers and in particular from natural rubber, synthetic polyisoprenes, polybutadienes, polychloroprenes, chlorosulfonated polyethylenes, elastomeric polyurethanes, fluorinated elastomers (further known as fluoroelastomers), isoprene-isobutylene copolymers (further known as butyl rubbers), ethylene-propylene-diene (or EPDM) copolymers, styrene-isoprene-styrene (or SIS) block copolymers, styrene-ethylene-butylene-styrene (or SEBS) block copolymers and mixtures thereof, it being understood that the selection of the elastomer there also depends on the use for which the material is intended.

Thus, for example, for the manufacturing of gloves, the elastomer is preferably selected from polychloroprenes and even better from polychloroprenes which resist to crystallization and consequently retain particularly well their flexibility over time. Such polychloroprenes are for example marketed by DuPont Performance Elastomers under the names of Neoprene® WRT and Neoprene® WD.

According to the invention, the material may further comprise, depending on the use for which it is intended and on how it will be applied within the scope of this use, one or more adjuvants of the type of those conventionally used in the polymer industry such as one or several plasticizers, flexibilizing agents, antistatic agents, lubricating agents, adherence promoters or coloring agents, in which case the total mass of these adjuvants preferably does not represent more than 10% of the mass of the material.

The elastomeric material according to the invention may be prepared by a method which comprises:
   dry mixing of the elastomer with bismuth trioxide, tungsten trioxide, lanthanum trioxide and the optional adjuvant(s) for example in an internal mixer; and
   transformation of the thereby obtained mixture into a material.

Preferably, the mixture is transformed for example by calendering, drawing and granulation, into a material which appears as granules which may then be used for manufacturing protective articles against ionizing radiations.

Therefore an object of the invention is also the use of an elastomeric material as defined earlier for manufacturing a protective article against ionizing radiations.

Considering the elastomeric nature of the material according to the invention, the protective article is preferably an individual protective article such as an apron, chasuble, jacket, skirt, glove, sleeve, thyroid protection, gonad protection, eye protection band, breast protection bra or else further a surgical drape or sheet.

However, this may also be a collective protective article such as for example a curtain which desirably has some flexibility, notably for storage convenience.

In every case, this protective article which may comprise one or more layers consisting of the elastomeric material according to the invention, either associated or not with one or several layers in another material such as for example a textile material, may be manufactured by transforming the elastomeric material according to the invention into films, sheets or plates, by conventional molding, extruding techniques or the like, and then by cutting out parts with a suitable shape in these films, sheets or plates, and assembling these parts together and/or with other parts by sewing, welding or adhesive bonding.

However, in certain cases, and notably in the case when the protective article is a glove, it is preferred:

on the one hand that this protective article be a multilayer article, i.e. it comprises at least one layer in an elastomeric material according to the invention sandwiched between at least two layers in another elastomeric material; and on the other hand that it be made as a single part so that it does not exhibit any area where the attenuation of the ionizing radiations may be reduced due to the presence of a seam, a weld, an adhesive or the like.

In this case, the protective article is advantageously manufactured by the conventional soaking technique which consists of forming an object by dipping a mold with a suitable shape in a succession of baths resulting from the dissolution in volatile solvents of the elastomeric materials intended to enter the composition of this object.

According to the invention, the protective article against ionizing radiations is preferably a glove and more specially a glove intended for the handling of powders entering the manufacturing of nuclear fuels.

Also, the object of the invention is also a multilayer glove for protection against ionizing radiations, which is characterized in that it comprises at least one layer C2 in an elastomeric material as defined earlier, inserted between at least two layers, C1 and C3 respectively, in another elastomeric material, both of these layers may either be identical with each other or not as regards the elastomeric material which makes them up and their thickness.

According to the invention, the layers C1 and C3 may be in an elastomeric material selected from natural rubber, synthetic polyisoprenes, polybutadienes, polychloroprenes, chlorosulfonated polyethylenes, elastomeric polyurethanes, fluorinated elastomers, isoprene-isobutylene-copolymers, ethylene-propylene-diene copolymers, styrene-isoprene-styrene block copolymers, styrene-ethylene-butylene-styrene block copolymers, and mixtures thereof.

However, it is preferred that these layers be in an elastomeric polyurethane because of the particularly interesting mechanical strength properties which this type of elastomer exhibits.

Moreover, each of the layers C1, C2 and C3 may have a thickness from 50 to 1,500 μm.

Advantageously, the layer C2 has a thickness from 50 to 200 μm while the layers C1 and C3 have a thickness from 150 to 300 μm.

As the handling of powders of nuclear fuels is in principle carried out in glove boxes, the glove according to the invention preferably comprises a sleeve, typically with a frustoconical shape, with the same composition as it and with a measured length from 25 to 100 cm and even better with a length from 50 to 80 cm, so as to be able to be used in a glove box.

The glove according to the invention may be manufactured by a method which comprises at least:
   formation of the layer C1 by one or several successive soaking operations of a mold reproducing the shape of a hand and all or part of a forearm and an arm in a solution of the elastomeric material selected for forming this layer;
   formation of the layer C2 by one or several soaking operations of the mold in a solution of the elastomeric material according to the invention;
   formation of the layer C3 by one or several soaking operations of the mold in a solution of the elastomeric material selected for forming this layer;
each soaking operation being immediately followed by evaporation of the solvent present on the mold;

drying of the thereby formed glove and after removal of this glove from the mold, optional vulcanization.

The glove according to the invention has many advantages.

Indeed, it combines remarkable properties for attenuating ionizing radiations—since it has a capability of attenuating this type of radiation which may range, in lead equivalent, from 0.03 to 0.50 mm (depending on the thickness of the layer C2)—with an also remarkable flexibility since, for example, gloves comprising a layer C2 with a thickness of 100 μm (and ensuring a lead equivalent protection of 0.03 mm) have proved to have almost the same flexibility as that of gloves with comparable thickness but not containing any radio-opaque filler.

It further has very satisfactory mechanical strength properties.

It contains as a radio-opaque filler, a powder comprising metal oxides which do not have any toxicity known to this day for human health and the environment so that the removal of the waste stemming from its manufacture does not require any specific procedure for collection and treatment. Similarly, removal of the gloves after use does not require any specific procedure other than the one imposed by possible contamination of these gloves by radio-active materials.

Finally, it is simple to make and lends itself to additional treatments such as sterilization.

Because of its properties, the glove according to the invention is particularly interesting for ensuring protection against ionizing radiations emitted by powders of nuclear fuels, notably with plutonium.

However, it is also possible to use this glove in all the other fields where protection against ionizing radiations may be sought such as medical imaging (radiology, scanography, . . . ), interventional radiology, nuclear medicine (scintigraphy, radiotherapy, . . . ), treatment of plastics, inspection and control of manufactured parts, etc.

Other characteristics and advantages of the invention will become better apparent upon reading the additional description which follows, which relates to examples for making an elastomeric material and a glove according to the invention as well as for demonstrating radiation attenuation properties and mechanical properties of gloves according to the invention.

Of course, these examples are only given as illustrations of the object of the invention and by no means are a limitation of this object.

DETAILED DISCUSSION OF PARTICULAR EMBODIMENTS

EXAMPLE 1

Making an Elastomeric Material According to the Invention

An elastomeric material according to the invention is made by mixing:
- 100 parts by mass of a polychloroprene (Neoprene® WRT—DuPont Performance Elastomers);
- 267 parts by mass of a bismuth trioxide powder consisting of particles with a size of less than 20 μm;
- 33 parts by mass of a lanthanum trioxide powder of optical quality, consisting of particles measuring about 25 μm; and
- 33 parts by mass of a tungsten trioxide powder, consisting of particles with a size of less than 250 μm;

in an internal mixer adapted for the formulation of rubbers, and then submitting the resulting mixture to calendering (with which it is possible to complete homogenization of this mixture), to stretching as strips and then to granulation so as to obtain substantially cubic granules, the measured size of which is of the order of 0.5 cm.

A slight amount of talc is put on the granules in order to avoid their agglomeration while waiting to be used.

EXAMPLE 2

Making a Glove According to the Invention

A glove, which is manufactured by a soaking method, comprises a layer C2 formed with an elastomeric material according to the invention and which is inserted between two layers, C1 and C3 respectively, formed with an elastomeric polyurethane.

To do this, first of all two baths are prepared, one of which will allow the making of the layers C1 and C3 while the other one will allow the making of the intermediate layer C2.

The first bath is prepared, as known per se in the state of the art by dissolving 100 parts by mass of an aromatic thermoplastic polyurethane crosslinked beforehand into 500 parts by mass of a ketone solvent, and then filtering and degassing the resulting solution by putting it to rest for 24 hours.

The second bath is prepared by dissolving 100 parts by mass of granules such as those obtained in Example 1 hereinbefore, into 92.225 parts by mass of toluene in a propeller mixer rotating at a velocity of 1500 rpm and this for about two hours. The resulting solution is filtered by having it pass over a sieve with 160 μm meshes. Next, its viscosity (according to the AFNOR NFT 30-014 standard) and its dry extract content (by means of a halogen dessicator Mettler Toledo) are measured and if necessary, it is proceeded with adjustment of both of these parameters so that the first one is located around 180 Pa·s and the second one is of the order of 50%. The solution is then degassed by leaving it at rest for 24 hours.

Once both baths are ready, it is proceeded with five successive soakings of a hand-shaped china mold in the first bath in order to form the layer C1 (which will form the internal face of the glove), and then with soaking the mold in the second bath for forming the layer C2, and then with four successive soakings of the mold in the first bath in order to form the layer C3 (which will form the external face of the glove), it being understood that each soaking operation is immediately followed by an operation consisting of evaporating the solvent present on the mould and which is carried out at room temperature under an extractor.

At the end of the last solvent evaporation, the glove is left to dry several hours in a tunnel oven, the temperature of which does not exceed 100° C. and then it is removed from the mold.

A glove is thereby obtained, the layer C2 of which has a measured thickness of about 100 μm and the layers C1 and C3 each have a measured thickness of about 200 μm.

EXAMPLE 3

Radiation Attenuation Properties and Mechanical Properties of Gloves According to the Invention 3.1. Radiation Attenuation Properties Gloves as obtained in Example 2 hereinbefore were subject to tests aiming at assessing their capability of attenuating γ radiations emitted by powders entering the manufacturing of nuclear fuels.

To do this, they were used on glove boxes dedicated to the handling of powders entering the manufacturing of nuclear fuels, in an exploitation representative of significant dosimetry.

Thus γ radiation attenuation factors were obtained ranging from 1.5 to 4, i.e. factors equivalent to those obtained with the lead-bearing gloves customarily used on these glove boxes, which comprise a layer with a thickness of 100 μm, formed with lead oxide (litharge) particles dispersed in a polychloroprene, between two elastomeric polyurethane layers.

3.2. Mechanical Properties

Gloves according to the invention (G1 to G5 hereafter), having a thickness ranging from 600 to 700 μm and comprising a layer C2, in its composition and its thickness, identical with the layer C2 of the glove made in the Example 2 above, inserted between two layers C1 and C3 in elastomeric polyurethane, were subject to tensile tests according to the AFNOR NFT 46-002 standard.

Table 1 hereafter shows, for each of the tested gloves, the results obtained in terms of breaking resistance, maximum breaking force, breaking elongation and elasticity moduli at 20% and 100% of elongation during these tests as well as those obtained under the same conditions with gloves with comparable thickness but exclusively formed by elastomeric polyurethane (R1 to R5 hereafter).

TABLE 1

|  |  | Glove thickness (μm) | Breaking strength (Mpa) | Maximum breaking force (N) | Breaking elongation (%) | Elasticity modulus at 20% elongation (Mpa) | Elasticity modulus at 100% elongation (Mpa) |
|---|---|---|---|---|---|---|---|
| Gloves according to the invention | G1 | 600 | 31.7 | 76 | 671 | 1.1 | 1.9 |
|  | G2 | 600 | 32.6 | 78 | 666 | 1.0 | 1.7 |
|  | G3 | 680 | 26.0 | 71 | 651 | 1.0 | 1.6 |
|  | G4 | 700 | 25.1 | 70 | 669 | 1.1 | 1.7 |
|  | G5 | 600 | 30.1 | 72 | 819 | 1.0 | 1.8 |
|  | Average | 600 | 29.1 | 73 | 695 | 1.0 | 1.7 |
| Gloves in elastomeric polyurethane | R1 | 480 | 46.8 | 90 | 676 | 1.2 | 2.0 |
|  | R2 | 520 | 44.4 | 92 | 590 | 1.2 | 2.2 |
|  | R3 | 670 | 30.5 | 82 | 577 | 1.0 | 1.5 |
|  | R4 | 710 | 27.8 | 79 | 630 | 0.9 | 1.5 |
|  | R5 | 450 | 45.7 | 82 | 782 | 1.4 | 2.1 |
|  | Average | 570 | 39.0 | 85 | 651 | 1.1 | 1.9 |

This table shows that the elasticity moduli at 20% and 100% of elongation, and therefore the flexibility of the gloves according to the invention, are equivalent to those of gloves in elastomeric polyurethane, with comparable thickness but without any layer loaded with metals or metal oxides.

It also shows that the mechanical strength properties of the gloves according to the invention are also very satisfactory.

Cited References

[1] U.S. Pat. No. 5,548,125
[2] Patent Application US 2004/0262546
[3] Patent Application FR 2 911 991

The invention claimed is:

1. An elastomeric material comprising:
an elastomer in which is dispersed a powder of metal oxides,
wherein the powder of metal oxides comprises from 70 to 90% by mass of bismuth trioxide, from 5 to 15% by mass of tungsten trioxide, and from 5 to 15% by mass of lanthanum trioxide, such that said elastomeric material retains mechanical flexibility,
wherein said elastomeric material is constructed so as to attenuate ionizing radiation in accordance with a gamma-radiation attenuation factor, and
wherein said elastomer and said powder of metal oxides are selected in varying proportion to provide a particular mechanical flexibility and gamma-radiation attenuation factor.

2. The material according to claim 1, wherein the elastomer represents from 15 to 35% by mass of the mass of the elastomeric material and the powder of metal oxides represents from 65 to 85% by mass of the mass of the elastomeric material.

3. The material according to claim 2, wherein the elastomer represents 25±2% by mass of the mass of the elastomeric material and the powder of metal oxides represents 75±2% by mass of the mass of the elastomeric material.

4. The material according to claim 1, wherein the powder of metal oxides comprises 80±2% by mass of bismuth trioxide, 10±1% by mass of tungsten trioxide, and 10±1% by mass of lanthanum trioxide.

5. The material according to claim 1, wherein the powder of metal oxides consists of particles, at least 90% by number of which have a size of between 1 and 100 μm.

6. The elastomeric material according to claim 1, wherein the powder of metal oxides consists of particles, at least 80% by number of which have a size of between 1 and 50 μm.

7. The material according to claim 1, wherein the elastomer is selected from natural rubber, synthetic polyisoprenes, polybutadienes, polychloroprenes, chlorosulfonated polyethylenes, elastomeric polyurethanes, fluorinated elastomers, isoprene-isobutylene copolymers, ethylene-propylene-diene copolymers, styrene-isoprene-styrene block copolymers, styrene-ethylene-butylene-styrene block copolymers, and mixtures thereof.

8. The material according to claim 7, wherein the elastomer is a polychloroprene.

9. The material according to claim 1, further comprising one or more adjuvants selected from plasticizers, flexibilizing agents, antistatic agents, lubricating agents, adherence promoters, and coloring agents.

10. A protective article for protecting against ionizing radiations, said protective article comprising:
an elastomeric material in which is dispersed a powder of metal oxides,
wherein the powder of metal oxides comprises from 70 to 90% by mass of bismuth trioxide, from 5 to 15% by mass of tungsten trioxide, and from 5 to 15% by mass of lanthanum trioxide, such that said elastomeric material retains mechanical flexibility,
wherein said elastomeric material is constructed so as to attenuate ionizing radiation in accordance with a gamma-radiation attenuation factor, and
wherein said elastomeric material and said powder of metal oxides are selected in varying proportion to provide a particular mechanical flexibility and gamma-radiation attenuation factor.

11. The article according to claim 10, wherein said article is an apron, chasuble, jacket, skirt, glove, sleeve, thyroid protection, gonad protection, eye protection band, mammary protective bra, surgical drape, or a curtain.

12. The article according to claim 10, wherein said article is a glove.

13. A protective multilayer glove for protecting against ionizing radiations, comprising:
a first layer comprising at least one layer of an elastomeric material inserted between at least two other layers of another elastomeric material,
wherein said elastomeric material of said at least first layer comprises an elastomeric material in which is dispersed a powder of metal oxides,
wherein the powder of metal oxides comprises from 70 to 90% by mass of bismuth trioxide, from 5 to 15% by mass of tungsten trioxide, and from 5 to 15% by mass of lanthanum trioxide, such that said elastomeric material retains mechanical flexibility,
wherein said elastomeric material is constructed so as to attenuate ionizing radiation in accordance with a gamma-radiation attenuation factor, and
wherein said elastomeric material and said powder of metal oxides are selected in varying proportion to provide a particular mechanical flexibility and gamma-radiation attenuation factor.

14. The glove according to claim 13, wherein said at least two other layers comprise a second layer and a third layer in an elastomeric material selected from natural rubber, synthetic polyisoprenes, polybutadienes, polychloroprenes, chlorosulfonated polyethylenes, elastomeric polyurethanes, fluorinated elastomers, isoprene-isobutylene copolymers, ethylene-propylene-diene copolymers, styrene-isoprene-styrene block copolymers, styrene-ethylene-butylene-styrene block copolymers, and mixtures thereof.

15. The glove according to claim 14, wherein said second and third layers are in elastomeric polyurethane.

16. The glove according to claim 13, wherein each of the layers of the glove has a thickness from 50 to 1,500 μm.

17. The glove according to claim 16, wherein the first layer has a thickness from 50 to 200 μm and each of the at least two other layers has a thickness from 150 to 300 μm.

18. The glove according to claim 13, wherein the glove comprises a sleeve having a same composition as the glove, having a length of from 25 to 100 cm.

19. The glove according to claim 13, wherein the glove is adapted to protect against ionizing radiations emitted by powders of nuclear fuels.

20. The glove according to claim 13, wherein the at least two other layers are identical.

21. The material according to claim 1, wherein said gamma-radiation attenuation factor is from 1.5 to 4.

22. The material according to claim 1, wherein said mechanical flexibility is defined as an elasticity modulus of from 1.0 to 1.9 Mpa.

23. The article according to claim 10, wherein said gamma-radiation attenuation factor is from 1.5 to 4.

24. The article according to claim 10, wherein said mechanical flexibility is defined as an elasticity modulus of from 1.0 to 1.9 Mpa.

25. The glove according to claim 13, wherein said gamma-radiation attenuation factor is from 1.5 to 4.

26. The glove according to claim 13, wherein said mechanical flexibility is defined as an elasticity modulus of from 1.0 to 1.9 Mpa.

* * * * *